United States Patent
White

(10) Patent No.: US 6,904,129 B1
(45) Date of Patent: Jun. 7, 2005

(54) TWISTED PAIR STATUS INDICATOR

(75) Inventor: Isaac Daniel McIntosh White, Sanford, FL (US)

(73) Assignee: BellSouth International Property Corporation, Wilmington, DE (US)

(*) Notice: Subject to any disclaimer, the term of this patent is extended or adjusted under 35 U.S.C. 154(b) by 341 days.

(21) Appl. No.: 10/035,710

(22) Filed: Dec. 26, 2001

(51) Int. Cl.[7] .............................................. H04M 1/24
(52) U.S. Cl. .................... 379/25; 379/26.01; 379/29.1; 379/29.11; 379/325
(58) Field of Search .................... 379/156, 104, 379/166, 25, 21, 22.05, 26.01, 27.06, 27.07, 29.09, 29.1, 29.11, 327, 397, 325, 326, 329, 330, 412, 413, 413.02, 413.03, 413.04; 361/724, 726, 727, 826; 439/910, 43, 55, 76.1, 133, 296, 625; 116/306, 307, 315, 200, 209, 281

(56) References Cited

U.S. PATENT DOCUMENTS

| | | | | |
|---|---|---|---|---|
| 391,185 A | * | 10/1888 | Parker | 116/319 |
| 5,235,933 A | * | 8/1993 | Pare et al. | 116/204 |
| 5,692,452 A | * | 12/1997 | Nepovim | 116/315 |
| 6,065,530 A | * | 5/2000 | Austin et al. | 165/80.3 |
| 2003/0100219 A1 | * | 5/2003 | Dickens | 439/491 |

* cited by examiner

Primary Examiner—Curtis Kuntz
Assistant Examiner—Barry W Taylor
(74) Attorney, Agent, or Firm—Merchant & Gould

(57) ABSTRACT

A twisted pair status indicator is provided. The twisted pair status indicator may be attached to a twisted pair access terminal to indicate whether the access terminal has available and properly functioning twisted pairs. The twisted pair status indicator may comprise a sliding door that reveals an available indication when the sliding door is moved to one side. When the sliding door is moved to a second side, an unavailable indication is revealed. The indications may be characters, numerals or colors that indicate whether twisted pairs are available. The twisted pair status indicator may also include a lock on the sliding door so that only authorized personnel may make changes to the twisted pair status indicator.

14 Claims, 2 Drawing Sheets

TWISTED PAIR STATUS INDICATOR

FIELD OF THE INVENTION

This invention relates generally to telecommunications, and more particularly to a twisted pair status indicator for a twisted pair access terminal.

BACKGROUND OF THE INVENTION

As telecommunications customers use more telephone lines for facsimile machines, Internet access, telephone service and other uses, more telephone lines, or twisted pairs, need to be connected to homes and businesses. A twisted pair typically runs from a twisted pair access terminal (such as is typically found on a telephone pole) to a customer's home or business to provide a telephone line. A twisted pair is two insulated copper wires twisted around each other to reduce induction (and thus interference) from one wire to the other. The twists, or lays, are varied in length to reduce the potential for signal interference between the pairs. Several sets of twisted pair wires may be enclosed in a single cable. In cables greater than 25 pairs, the twisted pairs may be grouped and bound together in a common cable sheath. Twisted pair cable is a common type of transmission media and is the normal cabling from a central office to a home or office, or from a public branch exchange (PBX) to an office phone. Twisted pairs include two copper conductors, which are generally solid core, although stranded wire is used occasionally in some applications. Each conductor is separately insulated by polyethylene, polyvinyl chloride, flouropolymer resin, Teflon, or some other low-smoke fire retardant substance. The insulation separates the conductors, thereby avoiding shorting the electrical circuit which is accomplished by virtue of the two conductors, and serves to reduce electromagnetic emissions. Both conductors serve for signal transmission and reception.

When connecting a new telephone line for a customer, an installation technician may be instructed by a call center where to find a vacant twisted pair located at a specific twisted pair access terminal. For example, the call center may instruct the installation technician that there is an available twisted pair at an access terminal located at a certain address or a certain geographic location. Even though the call center has records indicating that the access terminal has an available twisted pair, the call center records are sometimes incorrect. Therefore, typically, the installation technician arrives at the location of the access terminal and verifies that the twisted pair is in fact available and functioning. To verify that a twisted pair is available and functioning, the installation technician climbs a pole (if the access terminal is on a telephone pole), and tests binding posts inside the access terminal. Typically, each twisted pair is connected to a tip binding post and a ring binding post. The twisted pairs in the access terminal are tested to determine if there is a vacant pair that is functioning properly. Oftentimes, there is not a vacant pair if all the twisted pairs are grounded, shorted or in use. The verification process may be time-consuming. Oftentimes, another installation technician or a cable installation technician (who originally installs the twisted pairs) has previously tested the twisted pairs. However, this previously gathered information is not typically available to other installation technicians.

Accordingly, there is a need in the art for a twisted pair status indicator to indicate whether there are available and functioning twisted pairs in an access terminal. It is with respect to these considerations and others that the present invention has been made.

SUMMARY OF THE INVENTION

In accordance with the present invention, the above and other problems are solved by a twisted pair status indicator. In one embodiment, the twisted pair status indicator is attached to an access terminal containing a plurality of twisted pairs. The twisted pair status indicator may include a first indicator means for indicating that at least one of the plurality of twisted pairs is available and a second indicator means for indicating that none of the plurality of twisted pairs is available. The twisted pair status indicator may also include a sliding mechanism, such as a door, for sliding from a first side of the indicator to reveal the first indicator means and for sliding to a second side of the indicator to reveal the second indicator means. In another embodiment, the twisted pair status indicator may also include a locking mechanism attached to the sliding mechanism to prevent the sliding mechanism from moving unless the locking mechanism is unlocked. In different embodiments, the indicator means may be text, colors, numbers or other identifying information to indicate whether or not there are available twisted pairs. In still other embodiments, a flag or other indication may indicate whether or not there are available twisted pairs.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION

In accordance with an exemplary embodiment of the present invention, a twisted pair status indicator is provided. The twisted pair status indicator may be attached to a twisted pair access terminal to indicate whether the access terminal has available and properly functioning twisted pairs. In one embodiment, the twisted pair status indicator comprises a sliding door that reveals an available indication when the sliding door is moved to one side. When the sliding door is moved to a second side, an unavailable indication is revealed. The indications may be characters, numerals or colors that indicate whether twisted pairs are available. For example, the available indication may be colored with a background of green with the characters "AVAILABLE" written in another color and the unavailable indication may be colored with a red background with the characters "FULL" written in another color. The twisted pair status indicator may also include a lock on the sliding door so that only authorized personnel may make changes to the twisted pair status indicator.

Exemplary Operating Environment

Figure 1:
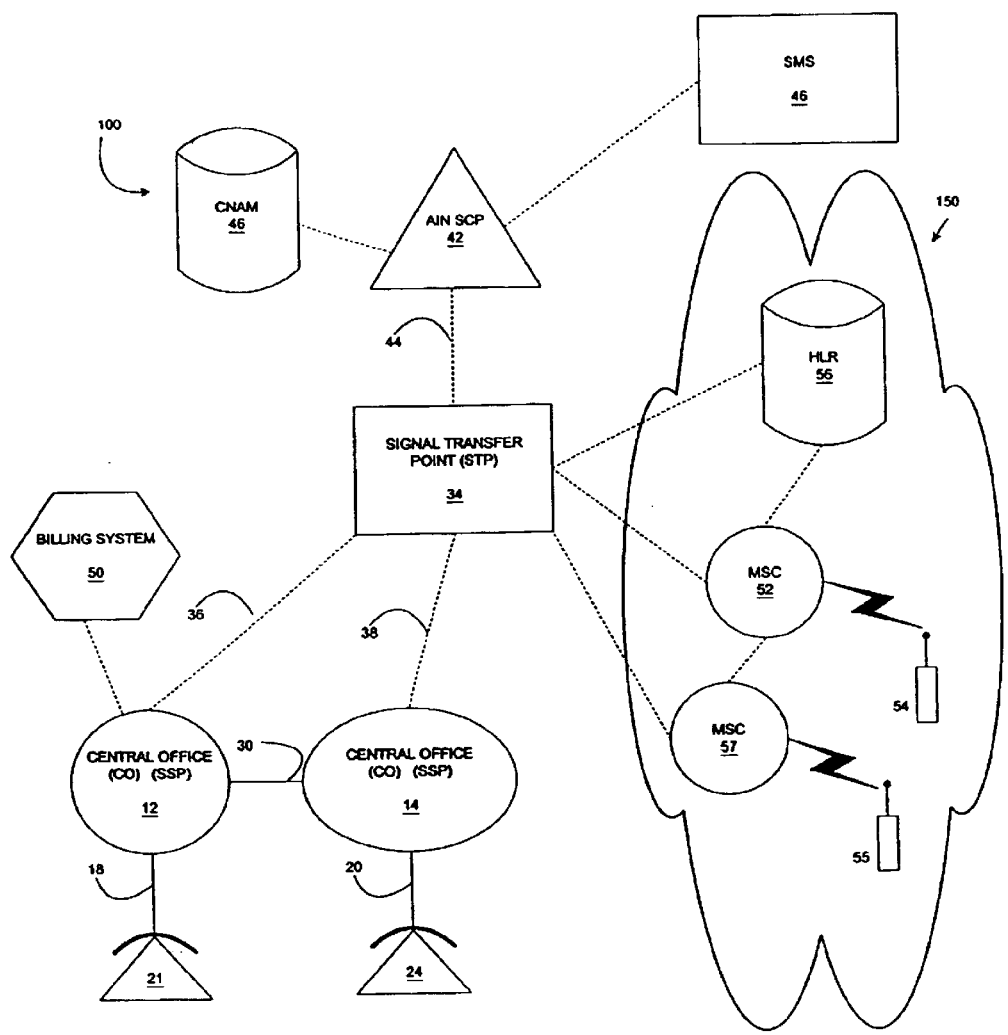
FIG. 1 is a block diagram illustrating components of a wireline and wireless telephone network that provides an exemplary operating environment for the present invention.

It is advantageous to describe an exemplary operating environment in which the current invention may reside. Typically, a twisted pair status indicator in accordance with an embodiment of the present invention is part of a twisted pair access terminal that connects the twisted pairs of a business or home with a telephone network, such as the telephone network described in FIG. 1. FIG. 1 is a block diagram illustrating components of a wireline and wireless telephone network that provides an exemplary operating environment for the present invention. Referring now to the drawings, in which like numerals represent like elements throughout the several figures, aspects of the present invention and the advanced intelligent network (AIN) and an integrated wireless network will be described.

The public switched telephone network that evolved in the 1980s incorporated the advanced intelligent network (AIN). Some of the components of the advanced intelligent network are illustrated in FIG. 1. FIG. 1 is a block diagram representing at least a part of the advanced intelligent network (AIN) 100 of a typical local exchange carrier integrated with components of a wireless network 150. The advanced intelligent network (AIN) uses the signaling system 7 (SS7) network for signal or system control message transport. The components thereof are well-known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices are provided in a typical public switched telephone network. As shown in FIG. 1, each central office may include an electronic switch known to those skilled in the art as a service switching point (SSP). These are indicated in FIG. 1 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30 and 32.

As shown in FIG. 1, central offices switches (SSP) 12 and 14 have a plurality of subscriber lines 18 and 20 connected thereto. Each of the subscriber lines 18 and 20 is connected to a terminating piece or pieces of customer premises equipment that are represented by telephones 21 and 24. SSP switches 12 and 14 are connected by a plurality of trunk circuits 30. These are the voice path trunks that interconnect the central offices 12 and 14 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local AIN service control point (SCP) 42 that is connected to signal transfer point 34 via SS7 data link 44. As is known to those skilled in the art, AIN service control points, such as AIN SCP 42, are physically implemented by relatively powerful fault tolerant computers. Among the functions performed by the service control points is maintenance of network databases used in providing enhanced services.

Additional devices for implementing advanced network functions within the AIN 10 are provided by regional STPs (not shown), regional AIN SCPs (not shown), and a service management system (SMS) 46. The STP 34 is connected to the SSPs via connections 36, 38 and 40. Both the regional AIN SCPs and the local AIN SCP 42, which represent a plurality of local AIN SCPs distributed throughout the AIN 10, are connected via respective data links to the SMS 46. The SMS 46 provides a centralized platform for remotely programming the various AIN SCPs of the AIN 10 so that a coordinated information processing scheme may be implemented for the AIN 10. The SMS 46 is implemented by a large general purpose computer and interfaces to business offices of the local exchange carrier and interexchange carriers. SSPs download, on a non-real time basis, billing information to a billing system 50 that is needed in order to appropriately invoice subscribers for the services provided.

The AIN SCP 42 is also connected to a caller ID with name (CNAM) database 46. The CNAM database comprises a plurality of directory numbers along with associated names for the directory numbers. The CNAM database may be used to provide a look-up database to provide caller ID service. The CNAM database may comprises directory numbers from wireline customers as well as wireless customers of wireless network 150.

In operation, the intelligent network elements of the AIN 100, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12 and 14, a relatively small set of triggers are defined at the SSP central office switches for each call.

For preparation of billing information, the subscriber's telecommunications service provider is generally responsible for maintaining records for both local and long distance wireline and wireless services and producing billing statements for individual subscribers. The billing system 50, otherwise known as a call accounting system, includes computer systems, memory storage, software, and some mechanical methods for connection to the telephone network described with respect to FIG. 1. A billing system 50 is used to record information about the telephone calls, organize that information, and upon being asked, prepare statements related to subscriber use of telephone services. The information recorded or captured about telephone calls includes all information required to prepare periodic billing statements to subscribers for use of telephone services. Representative information includes type, date, time, duration, originating point and terminating point for telephone calls combined with subscriber information such as calling plan information, discounts provided to a subscriber, and the like.

The billing system 50 produces these billing statements, which are typically mailed to subscribers on a periodic basis. Information may be downloaded from the SSP 12 to the billing system 50 in association with the preparation of the billing statements. The operation of a billing system of a telecommunications service provider, such as the billing system 50, is well-known to those skilled in the art.

It will be appreciated that the billing system 50 may prepare records for each subscriber on a per communication basis. These per communication records for a particular subscriber are typically created by the originating switch that serves the subscriber's line. Preferably, the AIN central office switches, such as SSP 12, create call records detail records (CDR) that contain information on outgoing and incoming phone calls, including originating and terminating parties, originating and terminating destination, time of day, day of the week, duration of the call, type of call (wireline or wireless), and the like. Additionally, the call detail records typically contain call disposition information (e.g. answered, busy, etc.). The per communication call detail records created by the SSP 12 for the subscriber line 18 are periodically downloaded to the billing system 50 on a non-real time basis. The billing system 50 computes the costs for the communications represented by the various records and prepares billing statements to be mailed to the subscribers.

The wireless network 150, such as a cellular network, comprises a mobile switching center (MSC) 52. The MSC 52 is a switch providing services and coordination between wireless user in network 50 and external networks. The MSC 52 may be connected to STP 34 to provide information to the wireline network and receive information from the wireline network. The MSC 52 also communicates with a wireless subscriber, such as wireless telephones 54 and 55. For preparation of billing, the MSCs create call detail records (CDR) similar to the above-described AIN SSPs. The call detail records created by the MSCs are transmitted to the billing system 50 for preparation of periodic wireless subscriber billing.

The MSC 52 may also be connected to a home location register (HLR) 56. The HLR is an SS7 database used to identify/verify a wireless subscriber. The HLR also comprises data related to feature and services the wireless subscriber has. The HLR is also used during roaming to verify the legitimacy of the subscriber and to provide them with their subscribed features. The HLR 56 may also be connected to the STP 34 and/or SCP 42 of the wireline network. In certain embodiments of the present invention, such as when the calling party is a wireless phone customer, the HLR may be used to provide the calling party's name and calling party's number for the caller ID service.

The above description provides a context for a detailed description of embodiments of the present invention. An embodiment of the present invention operates as a twisted pair status indicator. Twisted pairs are used to connect a telephone network, such as is shown in FIG. 1, to homes and businesses. As illustrated in FIG. 1, subscriber lines 18 and 20 illustrate the connections between central offices and subscriber terminating equipment. However, it should be understood that a single wire does not run from a user's telephone to the central office. Instead, a communication path is maintained by a collection of wires and cable, mostly twisted pair, often in bundles, that connects like a chain to different equipment. For example, a telephone in a house may connect to a central office as follows. Telephone wiring within the house connects to a telecommunications provider's wire at a house protector (or station protector). This is the demarcation point where subscriber wiring ends and the telecommunications provider's wiring begins. From here a drop wire including several twisted pairs may go to a twisted pair access terminal (also known as a pole closure or aerial terminal or ready access terminal) mounted on a telephone pole. The twisted pair access terminal is the termination of the subscriber's drop wire. Drop wires typically include more than one twisted pair and may be between thirty feet and several thousand feet in length. The customer's twisted pair is connected to binding posts within the twisted pair access terminal. Depending on the twisted pair access terminal, a wire representing the customer's twisted pair is connected to the aerial cable servicing the neighborhood. This sort of access terminal is inline with the aerial cable and may serve as a connecting or splice point. Alternatively, a wire from the back of the access terminal may run to a splice case nearby to marry the access terminal's wire with the larger aerial cable that services the area. The aerial cable, also known as distribution cable or secondary feeder cable or F2, typically contains 50 or more twisted pairs. Several F2 cables may work their way back (aerially or underground) to a nearby serving area interface (SAI). The SAI may also be known as a B-box, a cross-connect box or an access point (AP). F2 cable pairs connect with F1 pairs at the SAI and individual twisted pairs are terminated. F1 or main feeder cables may then be routed to the nearest central office or to a multiplexer and then to a central office.

When connecting a new telephone line for a customer, an installation technician may be instructed by a call center where to find a vacant twisted pair located at a specific twisted pair access terminal. For example, the call center may instruct the installation technician that there is an available twisted pair at an access terminal located at a certain address or a certain geographic location. Even though the call center has records indicating that the access terminal has an available twisted pair, the call center records are sometimes incorrect. Therefore, typically, the installation technician arrives at the location of the access terminal and verifies that the twisted pair is in fact available and functioning. To verify that a twisted pair is available and functioning, the installation technician climbs a pole (if the access terminal is on a telephone pole), and tests binding posts inside the access terminal. Typically, each twisted pair is connected to a tip binding post and a ring binding post. The twisted pairs in the access terminal are tested to determine if there is a vacant pair that is functioning properly. Oftentimes, there is not a vacant pair if all the twisted pairs are grounded, shorted or in use. The verification process may be time-consuming. Oftentimes, another installation technician or a cable installation technician (who originally installs the twisted pairs) has previously tested the twisted pairs. However, this previously gathered information is not typically available to other installation technicians.

Thus, as will be described below, in one embodiment, the present invention is a twisted pair status indicator connected to an access terminal. The status indicator indicates whether there are any available and functioning twisted pairs available in the access terminal.

Figure 2:
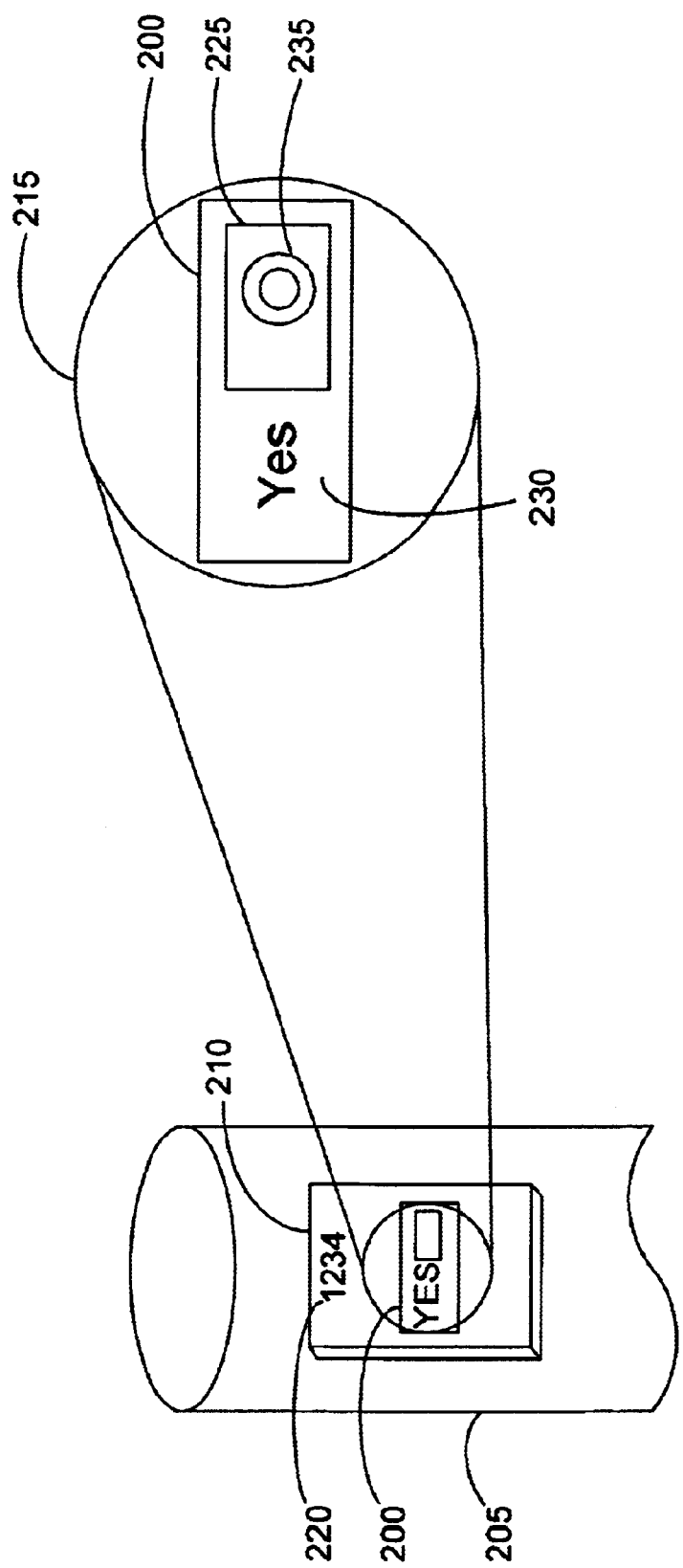
FIG. 2 is an illustration of a twisted pair status indicator in accordance with an embodiment of the present invention.

Referring now to FIG. 2, an illustration of a twisted pair status indicator 200 in accordance with an embodiment of the present invention will be described. The twisted pair status indicator 200 is part of a twisted pair access terminal 210. The twisted pair access terminal 210 may be an aerial or a ground terminal. For example, the twisted pair access terminal 210 may be attached to a telephone pole 205 as illustrated in FIG. 2. Alternatively, the twisted pair access terminal may be a ground terminal connected to underground cables. The twisted pair access terminal is typically identified by an address 220 or other identifying information such as a serial number or geographic location.

An enlarged view 215 of the twisted pair status indicator 200 is also illustrated in FIG. 2. In one embodiment, the twisted pair status indicator 200 comprises a sliding door 225 that reveals an available indication 230 when the sliding door is moved to one side. When the sliding door is moved to a second side, an unavailable indication is revealed (not shown in FIG. 2). The indications may be characters, numerals or colors that indicate whether twisted pairs are available. For example, the available indication may be colored with a background of green with the characters "AVAILABLE" written in another color and the unavailable indication may be colored with a red background with the characters "FULL" written in another color. The twisted pair status indicator may also include a lock 235 on the sliding door so that only authorized personnel may make changes to the twisted pair status indicator.

It should be understood that typically the cable construction and repair personnel will set the twisted pair status indicator when installing, setting up and maintaining the access terminals. A key may be inserted into lock 235 and the sliding door 225 may be moved to one side of the indicator 200 revealing an available indication 230. The sliding door may be moved to a second side of the indicator 200 revealing an unavailable indication (not shown).

It should be understood that in other embodiments, the twisted pair status indicator may comprise a flag rather than a sliding door. If the flag is in a first position, then there are no available and functioning twisted pairs while if the flag is in a second position, then there are available and functioning twisted pairs.

In other embodiments, the status indications (unavailable and available) may simply be colors so that the status is readily visible to workers on the ground.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

I claim:

1. A twisted pair status indicator, wherein the twisted pair status indicator is attached to an access terminal comprising, a plurality of twisted pairs, comprising:
a first indicator means for indicating that at least one of the plurality of twisted pairs is available;
a second indicator means for indicating that none of the plurality of twisted pairs is available; and
a sliding mechanism for sliding from a first side of the indicator to reveal the first indicator means and for sliding to a second side of the indicator to reveal the second indicator means.

2. The status indicator of claim 1 further comprising a locking mechanism attached to the sliding mechanism to prevent the sliding mechanism from moving unless the locking mechanism is unlocked.

3. The status indicator of claim 1 wherein the first indicator means is a first set of text indicating that at least one of the twisted pairs is available and wherein the second indicator means is a second set of text indicating that none of the plurality of twisted pairs is available.

4. The status indicator of claim 1 wherein the first indicator means is a first color indicating that at least one of the twisted pairs is available and wherein the second indicator means is a second color indicating that none of the plurality of twisted pairs is available.

5. The status indicator of claim 1 wherein the first indicator means is a first numeral indicating that at least one of the twisted pairs is available and wherein the second indicator means is a second numeral indicating that none of the plurality of twisted pairs is available.

6. An telecommunications access terminal, wherein the access terminal connects a plurality of twisted pairs with a telecommunications network, comprising:
a metal enclosure enclosing a plurality of binding posts;
a plurality of binding posts connected to the plurality of twisted pairs; and
a twisted pair status indicator, wherein the twisted pair status indicator is attached to the access terminal, and wherein the indicator comprises
a first indicator means for indicating that at least one of the plurality of twisted pairs is available,
a second indicator means for indicating that none of the plurality of twisted pairs is available,
a sliding mechanism for sliding from a first side of the indicator to reveal the first indicator means and for sliding to a second side of the indicator to reveal the second indicator means, and
a locking mechanism attached to the sliding mechanism to prevent the sliding mechanism from moving unless the locking mechanism is unlocked.

7. The access terminal of claim 6 wherein the first indicator means is a first set of text indicating that at least one of the twisted pairs is available and wherein the second indicator means is a second set of text indicating that none of the plurality of twisted pairs is available.

8. The access terminal of claim 6 wherein the first indicator means is a first color indicating that at least one of the twisted pairs is available and wherein the second indicator means is a second color indicating that none of the plurality of twisted pairs is available.

9. The access terminal of claim 6 wherein the first indicator means is a first numeral indicating that at least one of the twisted pairs is available and wherein the second indicator means is a second numeral indicating that none of the plurality of twisted pairs is available.

10. A telecommunications line status indicator, wherein the indicator is attached to an access terminal comprising a plurality of telecommunications lines, comprising:
a first visual indicator indicating that at least one of the plurality of twisted pairs is available;
a second visual indicator indicating that none of the plurality of twisted pairs is available; and
a sliding door, wherein the sliding door may be moved to a first position to reveal the first visual indicator and moved to a second position to reveal the second visual indicator.

11. The status indicator of claim 10 further comprising a locking mechanism attached to the sliding door to prevent the sliding door from moving between positions unless the locking mechanism is unlocked.

12. The status indicator of claim 10 wherein the first visual indicator is a first set of text indicating that at least one of the twisted pairs is available and wherein the second visual indicator is a second set of text indicating that none of the plurality of twisted pairs is available.

13. The status indicator of claim 10 wherein the first visual indicator is a first color indicating that at least one of the twisted pairs is available and wherein the second visual indicator is a second color indicating that none of the plurality of twisted pairs is available.

14. The status indicator of claim 10 wherein the first visual indicator is a first numeral indicating that at least one of the twisted pairs is available and wherein the second visual indicator is a second numeral indicating that none of the plurality of twisted pairs is available.

* * * * *

UNITED STATES PATENT AND TRADEMARK OFFICE
CERTIFICATE OF CORRECTION

PATENT NO. : 6,904,129 B1
DATED : June 7, 2005
INVENTOR(S) : Isaac Daniel McIntosh White It is certified that error appears in the above-identified patent and that said Letters Patent is hereby corrected as shown below:

Column 8,
Line 1, should read:
-- 6. A telecommunications access terminal, wherein the access terminal connects a plurality of twisted pairs with a telecommunications network, comprising:
 a metal enclosure enclosing a plurality of binding posts;
 a plurality of binding posts connected to the plurality of twisted pairs; and
 a twisted pair status indicator, wherein the twisted pair status indicator is attached to the access terminal, and wherein the indicator comprises
  a first indicator means for indicating that at least one of the plurality of twisted pairs is available,
  a second indicator means for indicating that none of the plurality of twisted pairs is available,
  a sliding mechanism for sliding from a first side of the indicator to reveal the first indicator means and for sliding to a second side of the indicator to reveal the second indicator means, and
  a locking mechanism attached to the sliding mechanism to prevent the sliding mechanism from moving unless the locking mechanism is unlocked. --.

Signed and Sealed this

Fourth Day of October , 2005

JON W. DUDAS
*Director of the United States Patent and Trademark Office*